Nov. 27, 1928.
A. D. CARDWELL
1,693,135
ELECTROMAGNET
Filed Feb. 17, 1927      3 Sheets-Sheet 1
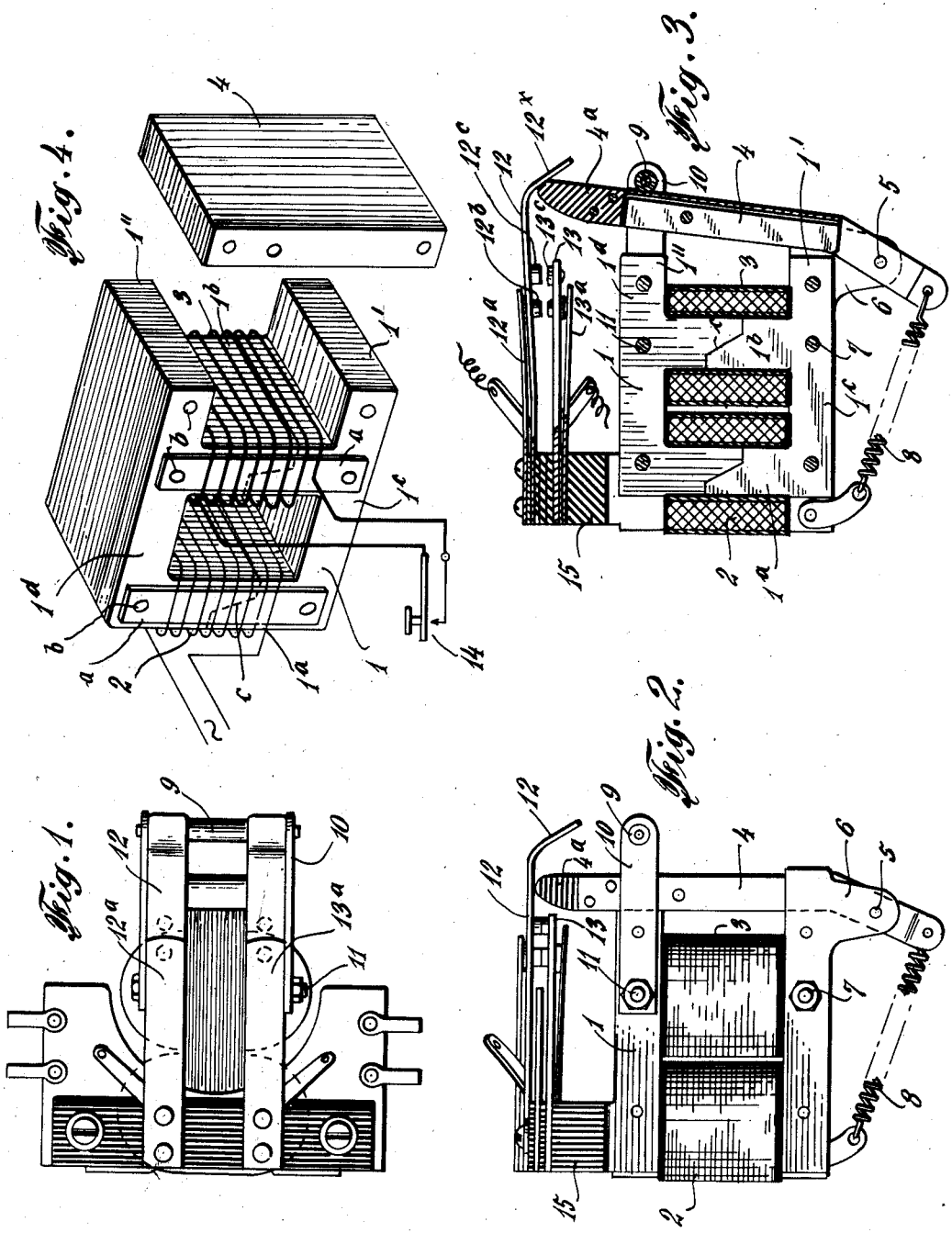
INVENTOR
A. D. Cardwell
BY
T. F. Bourne
ATTORNEY

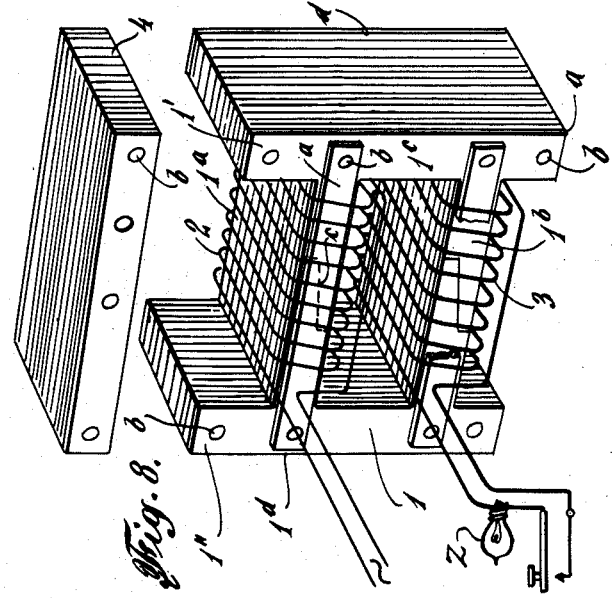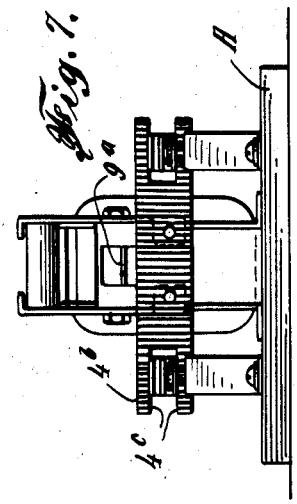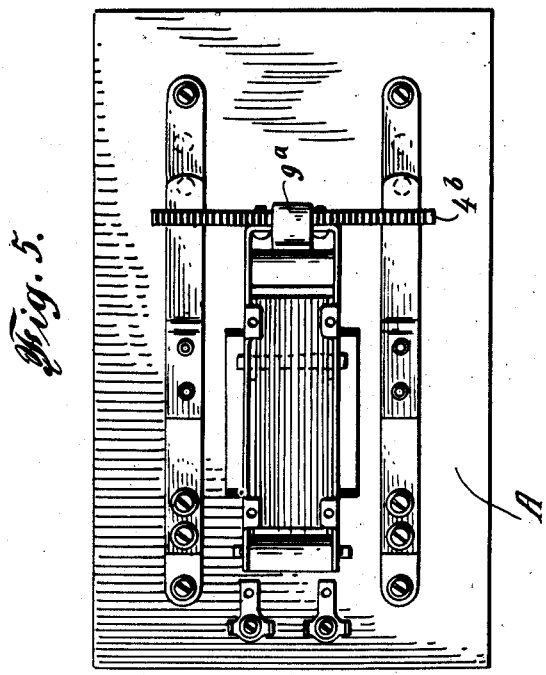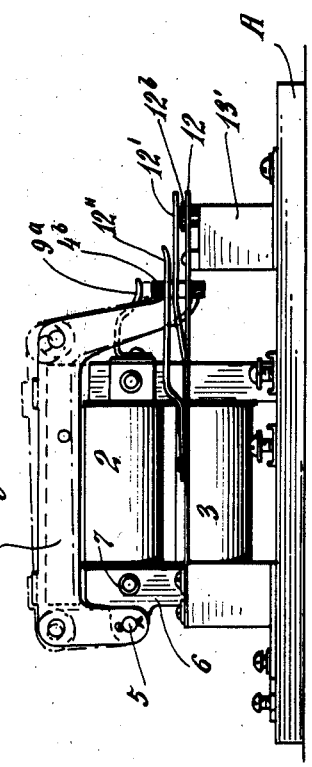

Nov. 27, 1928.
A. D. CARDWELL
1,693,135
ELECTROMAGNET
Filed Feb. 17, 1927   3 Sheets-Sheet 3
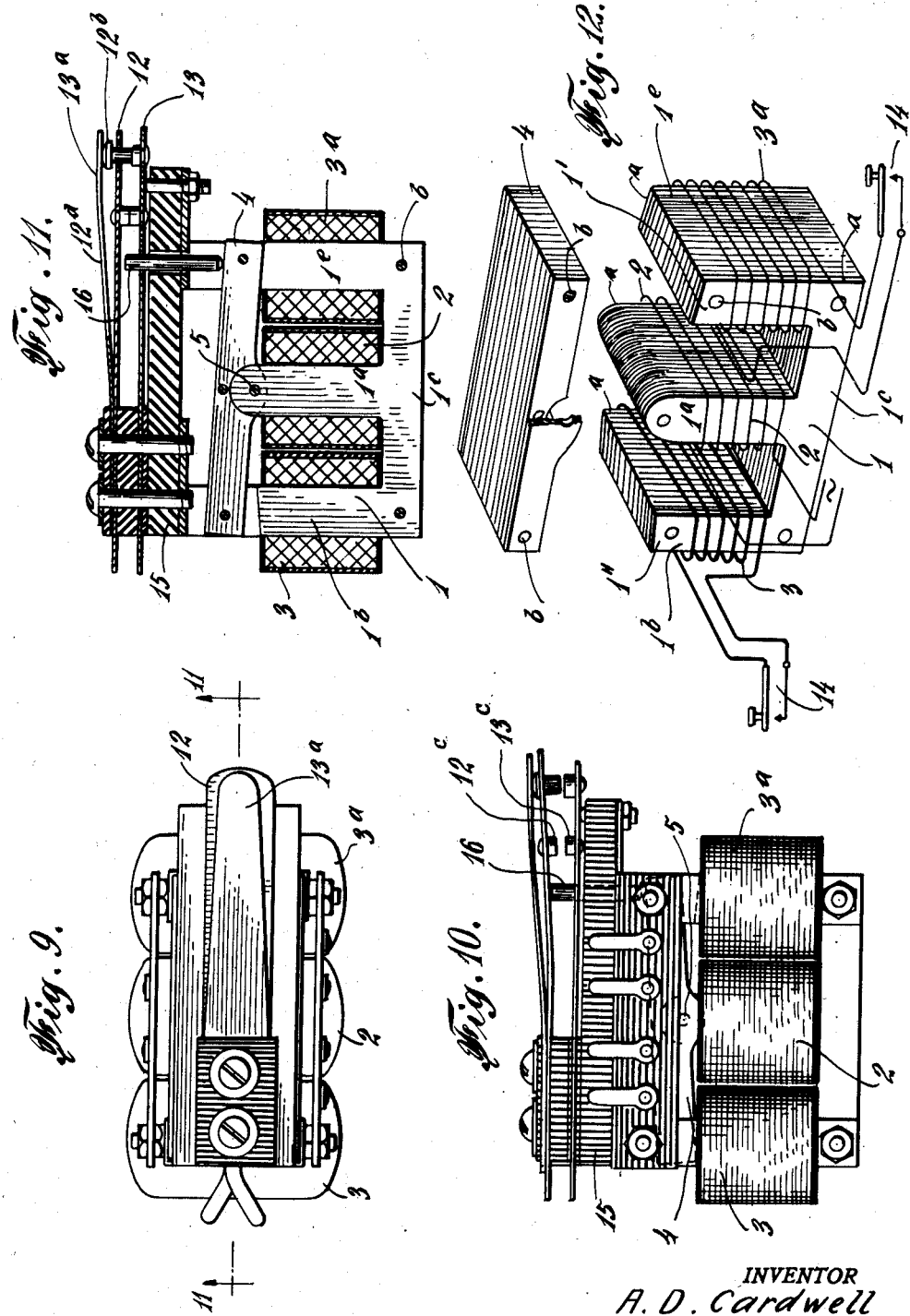
INVENTOR
A. D. Cardwell
BY
T. F. Bourne
ATTORNEY Patented Nov. 27, 1928.

1,693,135

UNITED STATES PATENT OFFICE.

ALLEN D. CARDWELL, OF ROCKVILLE CENTER, NEW YORK.

ELECTROMAGNET.

Application filed February 17, 1927. Serial No. 168,851.

An object of my invention is to provide an electromagnet wherein the magnetism to be used for the purpose of actuating an armature is the resultant of two opposing magnetic fluxes, one of which fluxes is generated by a coil energized from an input source of energy and the other flux is generated by the current induced in a controlling coil, which coil is coupled to or linked with the first mentioned flux. This permits the operation of an electromagnet having an energizing coil and a controlling coil by a controlling circuit which may have the same or a different difference of potential across the terminals of the winding of its controlling coil as/than the difference of potential across the energizing coil, so that although the initial current supply in the energized coil may be at a potential of, say, 120 volts the controlling coil may be operated from a current derived from the first named current which may have a difference of potential of, say, 4 volts and with the current in such circuits in inverse proportion to the voltages. This arrangement permits the operation of an electromagnet or the control of a relay by opening or closing a circuit not conductively connected to the source of power. This new magnet derives its armature operating energy from the utilization of the magnetic flux which is the resultant of the primary magnetic flux and a secondary magnetic flux acting in opposition in some parts of the magnetic circuit and acting in conjunction for generating a third magnetic flux in the armature circuit which is utilized for operation of the armature.

My invention comprises novel details of improvement that will be more fully hereinafter set forth and then pointed out in the claims.

Reference is to be had to the accompanying drawings forming a part hereof, wherein Fig. 1 is a plan view of a relay embodying my invention;

Fig. 2 is a side view of Fig. 1;

Fig. 3 is a central section of the relay;

Fig. 4 is a diagrammatic view;

Fig. 5 is a plan view of a modification;

Fig. 6 is a side view of Fig. 5;

Fig. 7 is an end view;

Fig. 8 is a diagrammatic view;

Fig. 9 is a plan view of another modification;

Fig. 10 is a side view of Fig. 9;

Fig. 11 is a section on line 11, 11, in Fig. 9, and

Fig. 12 is a diagrammatic view.

Similar numerals of reference indicate corresponding parts in the several views.

The numeral 1 indicates a core member of suitable magnetizable metal having spaced core portions $1^a$, $1^b$ connected by and extending from at least one metallic connector $1^c$ for magnetic purposes. In Figs. 1 to 8 the core portions $1^a$, $1^b$ are connected with two connector portions $1^c$ and $1^d$ having a magnetic circuit or course, whereas in Figs. 9 to 12 there is a single connector $1^c$ and two core portions $1^b$ and $1^e$ shown spaced on opposite sides of the core portion $1^a$. The core member may comprise laminated sheets retained together by external clamp plates $a$ and rivets or bolts $b$. On one of the core portions, indicated at $1^a$, is an energizing coil 2 and on the core portion $1^b$ is a controlling coil 3 in inductive relation to the coil 2. The core portions may be divided, as at $c$, to permit assembling of the coils.

In Figs. 1 to 8 the connectors $1^c$ and $1^d$ respectively have projecting portions or tips $1'$, $1''$ to attract an adjacent armature 4 which is shown pivotally supported at 5 in operative magnetic relation to the cores. The core member is shown provided with brackets or ears 6 supporting pivot 5, which brackets may be secured to the core member by means of screws or bolts at 7. In Figs. 1 to 3 a spring 8 connects the armature with the core member for normally withdrawing the armature from the core member against a stop 9, shown secured to arms 10 that project from and are attached to the core member by screws or bolts 11. In Figs. 5 to 7 the armature is shown so arranged as to dispense with a spring and to be withdrawn from the core member by gravity when the relay is in a vertical position with the pivot 5 at the bottom and the armature against a back stop $9^a$. The operation of the armature may be utilized to make and break any desired electrical circuit or to perform other work. In the form shown in Figs. 1 to 4 the armature 4 is shown provided with an insulating portion $4^a$ adapted to engage a spring-acting contact 12 to cause a normally open circuit to close at a spring-acting contact 13 when the armature is attracted. The contact 12 is shown provided with an offset or angularly disposed tip end portion $12^x$ adapted to be engaged by insulation $4^a$ when the relay is de-energized and the armature falls back. (Fig. 3.) Auxiliary spring $12^a$ presses carbon button $12^b$, loose in contact 12, toward similar button $13^b$ loose in contact 13, to first close circuit before closing at main contacts $12^c$, $13^c$, the reverse operation occurring on the break of the circuit, for the purpose of preventing sparking at and deterioration of contacts $12^c$ and $13^c$.

In the form shown in Figs. 5 to 7 the attraction of the armature causes closing of a normally open circuit. The armature has insulation $4^b$ to operate the spring-acting contact 12 with respect to contact block 13′, shown secured on insulating base A. The contact 12 carries auxiliary springs 12′ and 12″, and carbon contact $12^b$ loose in contact spring 12 to engage contact 13′ when the armature is attracted. Pressure of auxiliary spring 12′ retains the contact $12^b$ in place and provides the required pressure thereon. Auxiliary spring 12″ provides additional pressure for contact spring 12 when the armature is attracted. The spring assembly is shown within the forked portion $4^c$ of insulation $4^b$ to operate the springs in opposite directions. I have shown two sets of such spring contacts operative by insulation $4^b$ to control two circuits or two breaks in one circuit. The contact springs are shown carried by insulation 15 in Figs. 1, 2, 3, 10 and 11. In Figs. 9, 10, and 11 the contacts 12 and 13 are operated by a slidable pin 16.

The coil 2 may be supplied with alternating current from any desired source, such as a house lighting circuit, either continuously or interruptively during use of the magnet as hereinafter set forth.

The circuit of controlling coil 3 may be provided with any desired means to make and break the same, such as periodically or in accordance with temperature or pressure as in a room, boiler, refrigerator, or the like. The circuit controlled by contacts 12 and 13, or 12′ and 13′, may be utilized for controlling the operation of any desired instrument. At 14 is indicated a circuit controller in the circuit of coil 3.

In the form shown in Figs. 9 to 12 the armature 4 is pivotally supported, substantially centrally, at 5, (shown upon the core portion $1^a$) to rock respecting the core portions $1^b$ and $1^e$. The controlling coil 3 is upon the core portion $1^b$ and another controlling coil $3^a$ is upon the core portion $1^e$, which coils are in inductive relation to the energizing coil 2. The coils 3 and $3^a$ are in independent circuits, each of which may be opened and closed by any suitable circuit-breaking means, indicated at 14. When armature 4 is in the position shown in Fig. 10, attracted by core portion $1^b$, the circuit at the contacts 12 and 13 will be broken, and when the armature is in the position shown in Fig. 11, attracted by the core portion $1^e$, the circuit at said contacts will be closed.

In Figs. 4 and 8, if an alternating current is supplied to coil 2 an alternating magnetic flux will be generated which will flow in the closed magnetic circuit $1^a$, $1^d$, $1^b$, $1^e$ back to $1^a$. This alternating magnetic flux will tend to generate a difference of potential across the terminals of the coil 3 so that if said terminals are closed, such as at 14, current will flow through said coil, which current will tend to generate a magnetic flux in a direction opposite to the magnetic flux tending to induce said current. This tends to reduce the aforesaid magnetic flux through the magnetic circuit $1^a$, $1^d$, $1^b$, $1^e$, which is immediately counteracted by an increased current flow through coil 2, so that the magnetic flux flowing through $1^a$ remains practically constant, regardless of the amount of current flowing through coil 2 or through coil 3. However, there is provided an alternative magnetic path through pole tips 1′, 1″ and armature 4 in close proximity thereto, so that the magnetic flux generated by reason of current flowing through coil 3 has an alternative path through pole tips 1′, 1″, armature 4, and through the intervening air gap, thereby attracting said armature to the pole tips, which tips will remain magnetized because of the counter magnetic flux generated from the current flowing through coil 3. This alternative magnetic circuit through the pole tips and the armature has a greater reluctance than the magnetic circuit through $1^a$, $1^d$, $1^b$, $1^e$, and, therefore, when contact at 14 is broken the magnetism through pole tips 1′, 1″ is greatly reduced and armature 4 will move away, the flux now flowing wholly through $1^a$, $1^d$, $1^b$, $1^e$, inasmuch as there is no counter magnetic force tending to oppose it.

In Fig. 11, assume the armature 4 to be in the position as illustrated, and an alternating current flowing through coil 2. Such current will generate an alternating magnetic flux through the magnetic circuit $1^a$, 4, $1^e$, $1^c$, and a greatly reduced magnetic flux will tend to flow through $1^a$, $1^e$, $1^b$ and 4, with the intervening air gap adding considerable reluctance to the magnetic flow, so that when circuit is closed across terminals of coil 3 practically no current will be generated in said coil. However, if the circuit of coil $3^a$ be closed current will flow through it and such current will tend to generate a magnetic flux which will tend to oppose the magnetic flux through $1^a$, generated by the current in coil 2, and the current in coil 2 will tend to increase because of the reduction of inductance of coil 2 and the excess magnetism or the extra magnetism generated by this extra current flow will flow through the alternative path $1^a$, $1^e$, $1^b$, air gap and return through 4, increasing the flux between $1^b$ and 4 which will attract armature 4 to $1^b$ and away from $1^e$, to the position shown in Fig. 10. This will reduce the flux flowing through 1ᵉ and therefore reduce the current induced in 3ᵃ, and thereafter the total flux or practically the total flux through 1ᵃ will flow through magnetic circuit 1ᵃ, 1ᶜ, 1ᵇ and armature 4, retaining the armature. Opening and closing of the circuit of coil 3ᵃ will not now cause operation of the armature. To operate the armature in the direction opposite to its last named operation, (as in Fig. 10), the circuit through coil 3 will be closed, thus increasing the magnetic flux between 1ᵉ and 4 and decreasing the flux between 1ᵇ and 4, and the armature will move to the position of Fig. 11. Opening and closing of the circuit of coil 3 will not now cause operation of the armature.

In Figs. 1 to 3 the armature is retracted by the spring 8 so that if no energizing current is supplied the contacts will be held open. In Figs. 5 to 7 the armature is retracted by gravity so that if no energizing current is supplied the contacts will be held open because of the preponderance of weight on one side of the pivot 5.

In Figs. 9, 10 and 11 the armature is operated against the tension of springs 12 and 12ᵃ, through slidable pin 16, in one position, so that if energizing current is withdrawn tension of such springs will tend to throw the armature to the position shown in Fig. 11, permitting contacts 12, 13, to remain closed because of tension in contact spring 12. However, as long as energizing current is supplied through winding 2 the armature will be held in the position of the last operation because of the particular controlling coil last closed.

In said figures it requires but a single momentary contact to cause the operation of the armature from one position to another, which will be retained in set position regardless of further closing of a given controlling circuit, and the position of the armature can only be changed by closing the opposite controlling circuit momentarily, at which time the armature will be retained in such second position so long as energizing current is supplied.

The sequence of closing the energizing and controlling coils is immaterial. It requires conjoint operation of both coils to operate the armature. The controlling coil may be continuously closed and the magnet operated by supplying energizing current as desired, or the energizing current can be supplied continuously and the magnet controlled by the opening and closing of the circuit of the controlling coil.

From the foregoing it will be understood that whenever the circuit of the controlling coil is closed the magnet will be energized, (Figs. 1 to 8), through a third magnetic circuit, which is a resultant of the flux through 1ᵃ and counter-flux through 1ᵇ. As long as the circuit of coil 3 remains closed after armature 4 has been drawn to the pole tips, and the reluctance of this circuit is comparatively low, the magnetic flux through 1ᵇ will be greatly reduced, and therefore the current generated in coil 3 will be reduced from its initial value when circuit of such coil was first closed. This will result in a reduced current flowing through coil 3 during the period immediately following operation of the armature and during retention of such armature, which reduces the amount of current consumed by the relay and reduces the amount of current through the coil 3, which has to be broken at any contact 14. This feature is also applicable to the relay shown in Figs. 9 to 12, and in this case the initial current flow through the controlling winding will be large in proportion to current flowing through a controlling winding after the armature 4 has been moved to the opposite pole tip, and as the circuit of the controlling winding is subsequently closed and opened a relatively small amount of current will be broken at the contact points 14. This feature means that a relatively large energizing and controlling current is used only for the actual operation of the relay and a lesser amount is drawn during holding periods, thus reducing the amount of energy consumed and adding to the longevity of the contacts.

My improved electro-magnet provides means of operation which are controlled from a circuit not conductively connected to the source of current supply, so that the magnet or relay may be used on high voltages but controlled from low voltages, or vice-versa, and it provides means for adequately separating the controlling winding from any source of current supply which might be dangerous or which it might not be desired to bring in contact with the controlling means. For example, the energizing circuit may be a grounded circuit and the controlling circuit may be connected to apparatus which it would not be desirable to have grounded, or vice-versa.

Although I have illustrated a magnet and circuits wherein all of the current generated in a controlling circuit is utilized for the purpose of generating magnetism for the operation of an armature on the magnet, it is possible to include any electrical unit or any electrical apparatus desired in the controlling circuit to be operated by some of the energy in said circuit, without preventing the operation of armature 4. This would be governed by the amount of energy extracted from the circuit for the operation of the extraneous apparatus in proportion to the amount of energy required for the operation of the armature 4. For example, it might be desirable to operate a lamp Z, (Fig. 8, as an indication of the closing of the controlling circuit, which lamp would be illuminated by the current generated in the controlling winding.

The operation of the armature 4 increases the inductance of the magnetic circuit and, therefore, increases the inductance of the input circuit, thereby reducing the amount of energy supplied to the magnet as soon as its armature has been operated. To follow through a cycle of operation of the magnet from a current supply standpoint the following will be self-evident: the normal supply current will have a value determined by the inductance of the coil 2, which supply current will be momentarily increased as soon as an operating controlling winding is closed, and this heavy current will flow until armature 4 has moved to its operated position, at which time the current will be reduced to a smaller value than the operating current, but to a greater value than the normal supply current, and it will be further reduced to the normal supply current as soon as the controlling circuit is opened. The difference between the normal supply current and the current consumed during the period that the controlling circuit is closed represents the amount of energy creating useful magnetic flux for the operation of the armature, and the amount of current represented by the difference between the operating current before the armature has operated represents the amount of energy available as useful magnetism for the operation of the armature 4. To review this, it will be seen that the magnet may consume several times its normal current before its armature has operated, but as soon as its armature has been operated it will immediately be reduced to a small value, thus preventing overheating and reducing the amount of energy required to hold the magnet in its operated position.

Having now described my invention what I claim is:—

1. An electromagnet including an armature, means to produce a magnetic circuit, and means to produce a second magnetic circuit in inductive relation to and operative only by the first named circuit for producing a resultant magnetic flux for operation of the armature, the armature being out of control by either magnetic circuit independently.

2. A magnet including an armature, means to create a closed magnetic circuit, incapable of operating the armature, and means to create another magnetic circuit incapable of operating the armature, said magnetic circuits having a common path producing a third magnetic circuit through the armature to attract the armature.

3. A magnet as set forth in claim 2, including an air gap at the armature requiring energization of both magnetic circuits to create sufficient magnetism to attract the armature.

4. A magnet comprising an armature, core portions in magnetic relation for the flow of magnetic flux therethrough, and a coil on each of said core portions in inductive relation to one another, one of said coils being adapted to be energized from a source of energy to create magnetism in its core portion the other coil being energized only by the said energizing coil, the current in the said other coil creating magnetism in its core portion in opposition to the magnetism created by the energizing coil for producing a resultant magnetism to attract the armature.

5. An electromagnet including a core member, an energizing coil thereon, a controlling coil thereon in inductive relation to and operative only by the energizing coil, and an armature operative by magnetism in the core member resultant from opposition of the two magnetic fluxes in the core member to attract the armature.

6. An electromagnet comprising a core member, an armature, and coils on different portions of the core member in inductive relation to each other, one coil being energizable only by the other coil, each coil when energized producing magnetism in the core member, the magnetism derived from one coil being in opposition to the magnetism derived from the other coil producing a resultant magnetism in the core member adapted to attract the armature.

7. A magnet as set forth in claim 6, in which the magnetism derived from either coil alone is insufficient to attract the armature.

8. A magnet comprising a core member having spaced core portions in magnetic relation, an energizing and a controlling coil upon corresponding core portions, said coils being in inductive relation to each other, one coil being energizable by the other coil, and an armature operative by magnetism in the core member resultant from opposition of the two magnetic fluxes in said core member to cause operation of the armature.

9. A magnet as set forth in claim 8, in which the core member is provided with a plurality of tips to be engaged by the armature to form a closed magnetic circuit for the resultant magnetism through the armature.

10. A magnet comprising a core member including a plurality of spaced core portions and a connector in magnetic relation thereto, an energizing coil on one core portion, a controlling coil on the other core portion, said coils being in inductive relation, and an armature pivotally supported with relation to the core portion of the controlling coil to form a closed magnetic circuit with said core portion, the closing of the circuit of one of said coils causing magnetism in its core portion to energize the other coil to create opposing magnetism for the attraction of the armature.

ALLEN D. CARDWELL.